(12) United States Patent
Kochale

(10) Patent No.: US 7,496,282 B2
(45) Date of Patent: Feb. 24, 2009

(54) MPEG VIDEO RECORDING MEDIUM AND REPRODUCTION APPARATUS

(75) Inventor: Axel Kochale, Springe (DE)

(73) Assignee: Thomson Licensing, Boulogna-Billancourt (FR)

( * ) Notice: Subject to any disclaimer, the term of this patent is extended or adjusted under 35 U.S.C. 154(b) by 678 days.

(21) Appl. No.: 10/499,556

(22) PCT Filed: Dec. 9, 2002

(86) PCT No.: PCT/EP02/13903

§ 371 (c)(1), (2), (4) Date: Jun. 21, 2004

(87) PCT Pub. No.: WO03/055233

PCT Pub. Date: Jul. 3, 2003

(65) Prior Publication Data

US 2005/0105896 A1 May 19, 2005

(30) Foreign Application Priority Data

Dec. 20, 2001 (DE) .................... 101 63 152

(51) Int. Cl.
*H04N 7/26* (2006.01)
(52) U.S. Cl. .................. 386/111; 386/52; 386/124; 386/125; 386/126; 386/112; 386/51
(58) Field of Classification Search ......... 386/111–112, 386/124–126
See application file for complete search history.

(56) References Cited

U.S. PATENT DOCUMENTS 5,784,527 A * 7/1998 Ort ............................ 386/111
6,157,675 A * 12/2000 Mitsuhashi et al. ..... 375/240.01
6,850,564 B1 * 2/2005 Pejhan et al. .......... 375/240.02
2002/0064228 A1 * 5/2002 Sethuraman et al. ... 375/240.12
2002/0097272 A1 * 7/2002 Tanaka ...................... 345/765
2005/0175096 A1 * 8/2005 Lee ........................ 375/240.03

FOREIGN PATENT DOCUMENTS

EP 606857 7/1994
EP 0606857 * 7/1994
EP 1143719 * 10/2001

OTHER PUBLICATIONS

Search Report Dated May 7, 2003.

* cited by examiner

*Primary Examiner*—Thai Tran
(74) *Attorney, Agent, or Firm*—Robert D. Shedd; Paul P. Kiel; Guy H. Eriksen

(57) ABSTRACT

The invention relates to an MPEG video recording medium and a reproduction apparatus for the reconstruction of missing data sequences of a video data stream. Scratches and other defects of the recording medium cause interruptions or disturbances in the data stream read from the recording medium, which can be corrected only to a limited extent by conventional error correction methods, such as the Reed-Solomon Code, for example. Therefore, an MPEG video recording medium is provided on which, with respect to an original I frame, at least one copy or a similar I frame is recorded on the recording medium for the reconstruction of missing or erroneous data sequences of a video data stream. The replacement I frames are arranged in the outer area, intermittently or within a predetermined area in the program area on the recording medium and do not influence the reproduction of the recording medium on conventional reproduction apparatuses. In a reproduction apparatus for the reconstruction of missing or erroneous data sequences of a video data stream from an MPEG video recording medium, provision is made of error detection means for determining the sector address of a missing or erroneous I frame, which are used to start a search for a copy or a similar I frame on the recording medium, and provision is made of control means by which a missing or erroneous I frame in the original data stream is replaced by the copy or the similar I frame for the reconstruction of missing or erroneous data sequences of the video data stream and is reproduced by a video decoder.

9 Claims, 3 Drawing Sheets

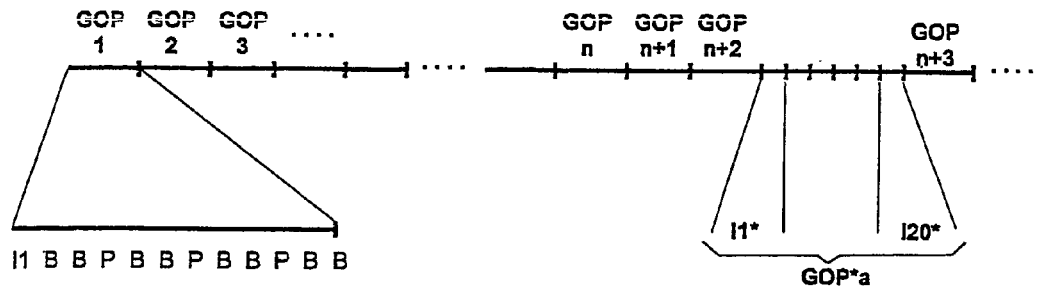
Fig. 6
TB1:
TableID;
EntryTag[MAXENTRIES];
PreviousTable;
TB2
ReferenceFrameSectorID;
RedundantFrameSectorID;
FrameInfoFlags;
Fig. 7
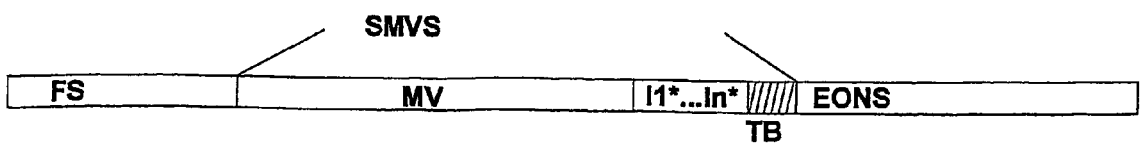
Fig. 8

MPEG VIDEO RECORDING MEDIUM AND REPRODUCTION APPARATUS

This application claims the benefit, under 35 U.S.C. § 365 of International Application PCT/EP02/13903, filed Dec. 9, 2002, which was published in accordance with PCT Article 21(2) on Jul. 3, 2003 in English and which claims the benefit of German patent application No. 10163152.9, filed Dec. 20,2001.

The invention relates to an MPEG video recording medium and a reproduction apparatus for the reconstruction of missing data sequences of a video data stream.

MPEG video recording media, such as, for example, a video-CD or video-DVD, are characterized in that a continuous data stream is recorded on them in accordance with the MPEG1 video standard or MPEG2 video standard. In this case, sequences of pictures are subdivided into groups designated as GOP, each group of pictures beginning with an I frame, with is also designated as an intraframe and whose information forms a prerequisite for the reproduction of the subsequent pictures in this group. The I frame is followed by B frames and P frames containing difference information with respect to the I frame, with which the pictures following the I frame are generated. B frames are bidirectional frames and P frames are also designated as predicted frames. Missing or disturbed I frames then prevent the representation of the subsequent pictures. Scratches and other defects of the recording medium cause interruptions or disturbances in the data stream read from the recording medium, which can be corrected only to a limited extent by conventional error correction methods, such as the Reed-Solomon Code, for example. ECMA standard 267 for DVD specifies, for example, that the diameter of air bubbles must not be greater than 100 µm and the diameter of so-called black spots must not be greater than 300 µm. It is demanded, moreover, that the total length of defects greater than 30 µm ought not to exceed a magnitude of 300 µm and that only six such defects are permitted.

Therefore it is an object of the invention to provide a recording medium and a reproduction apparatus which enable a reconstruction of the missing data sequences of the video data stream despite disturbed or missing I frames. Moreover, despite special properties of the recording medium, the intention is. also to enable a reproduction of the original data stream on conventional reproduction apparatuses.

This object is achieved by features specified in independent claims. Advantageous refinements are specified in dependent claims.

One aspect of the invention provides for additional information items comprising additional I frames or replacement I frames to be stored on the MPEG video recording medium. These I frames may be a copy of I frames contained in the original data stream or similar I frames with a smaller data volume, which are provided for the reconstruction of missing data sequences of the video data stream. This additional information is recorded on the recording medium at one or at a plurality of distances from the original I frame. What is achieved by the physical distance on the recording medium is that, in the case of a disturbed I frame in the original data stream, the said I frame can be partly or completely reconstructed. The physical distance from the original I frame is achieved by providing a separate data stream for additional I frames, which data stream is integrated section by section into the continuous data stream or is recorded following the original data stream. Information about the location of the additional information items is stored either on the recording medium or in a recording or reproduction apparatus provided for recording media of this type. MPEG video recording media with additional I frames and information about the recording location of these additional I frames can be used both in conventional reproduction apparatuses and in reproduction apparatuses specifically provided for these recording media.

In order to reduce the additional data volume, it is provided that, with respect to the original I frame, similar I frames are used as replacement I frames. A reduced data volume is achieved by using, as replacement I frames, by way of example, an image of smaller picture size, i.e. with a reduced spatial resolution, or a black/white picture instead of a colour picture.

The reproduction of recording media which have one or a plurality of copies or similar I frames in addition to the original I frame is made possible in conventional reproduction apparatuses by providing the additional information items on the recording medium in specifically provided MPEG data streams with a dedicated data stream number or as so-called user data, which are ignored by conventional reproduction apparatuses.

In an apparatus for the reproduction of information stored on MPEG video recording media, for the reconstruction of missing data stream sequences, it is provided that the absence of an I frame is detected and the missing or erroneous I frame in the data stream is replaced by a copy or a similar I frame. The copy or the similar I frame is provided as additional information on the recording medium. This results in an increased reliability of the complete reproduction of information stored on optical recording media.

A damaged or missing I frame which is to be replaced is detected by evaluating a discontinuity in the data stream, which is ascertained in various ways. In accordance with one embodiment, the sector numbering is monitored, while another embodiment evaluates a scanning device signal which signals the non-readability of a sector. Moreover, it is provided that the decoder uses the transmitted picture size to determine whether an I frame is incomplete or damaged. In these cases, the start sector number of the damaged I frame is already known and can be used for finding an I frame that is additionally provided on the recording medium. In accordance with this embodiment, a table is provided which specifies the location at which the I frame which can be used as replacement for this start sector number is stored. In the case of MPEG2 video data streams, it is possible, by way of example, to use the user data area into which a sector number for an additional I frame is entered for each group of pictures. Such a table is also advantageously used to detect missing I frames. This is made possible by comparing the sequence of the start sector numbers of the I frames with the entries in the table. In this case, the number of I frames to be replaced can be ascertained at the same time.

Furthermore, the absence of an I frame can be ascertained from the fact that a predetermined number of pictures in a group is exceeded, or in that the distance between time stamps provided in the data stream is evaluated.

After the identification of the damaged or missing I frame, the I frame provided as replacement on the recording medium is requested and inserted into the data stream in accordance with the requirements. The decoded replacement I frame is then used for the reconstruction of the missing data sequence.

The MPEG video recording medium may be a read-only, a write-once or a write-many optical recording medium. In the case of read-only recording media, the replacement I frames can be provided in the outer area, intermittently or within a predetermined area in the program area on the recording medium. In other words, on account of the addressing that can be used, the replacement I frames can be arranged both after and before the original I frame. Therefore, in the case of read-only recording media, replacement I frames can be arranged on the recording medium in such a way that the reproduction of the original data stream on conventional reproduction apparatuses is not influenced.

A predetermined writing strategy is to be complied with in the case of write-once and write-many recording media. A data stream to be recorded is generally buffered, however, so that it can be analysed with regard to I frames contained therein. After a predetermined number of groups of pictures, copies of I frames contained in the original data stream or similar I frames with respect to the original I frames are then recorded in sectors which follow the group of pictures. Moreover, during the recording of the replacement I frames, a table is formed which contains the start sector number of the original I frames and the sector number of the copy or similar I frames. This table is then recorded after the replacement I frames or at a distance therefrom on the recording medium. This results in an intermittent recording of replacement I frames which, on account of the concordance formed with the table, are used as required for reconstruction of missing or erroneous data sequences. In principle, it is also possible to record all the replacement I frames and the abovementioned table at the end of the data stream or at the end of the recording on the recording medium.

The fact that one or a plurality of copies of different or identical quality level to the original I frames are provided on the recording medium advantageously enables the reconstruction of missing or damaged data sequences during the reproduction of MPEG video information.

Scratches or other disturbances of optical recording media which, due to the fact that I frames cannot be read, usually lead to interruptions in the picture reproduction do not adversely affect the picture reproduction as a result of the use of the replacement I frames. As a result, a complete reproduction of recorded video information is made possible despite damaged recording media. The physical distance at which the replacement I frames are provided with respect to the original I frames is larger by a multiple than what is allowed by the customary measures for error correction, such as, for example, Reed-Solomon and channel bundling. Consequently, it is possible to eliminate even relatively large and multiply occurring errors which can no longer be corrected by the customary error correction.

In principle, there are various possibilities for advantageously refining and developing the present invention. In this respect, reference is made on the one hand to the claims and on the other hand to the following explanation of exemplary embodiments of the invention with reference to drawings.

The invention is explained in more detail below with reference to exemplary embodiments in drawings.

In the figures:

FIG. 6 shows an arrangement of additional or replacement information items in the original data stream.

FIG. 7 shows the content of tables which are used to produce a concordance with respect to copies or similar I frames, and FIG. 8 shows a schematic sketch relating to the structure of a video data stream.

Figure 1:
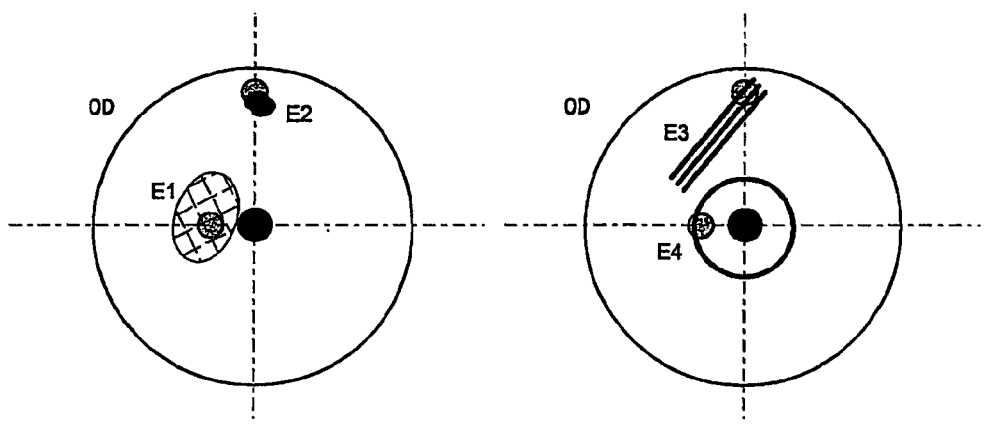
FIG. 1 shows imperfections on optical recording media.
Figure 2:
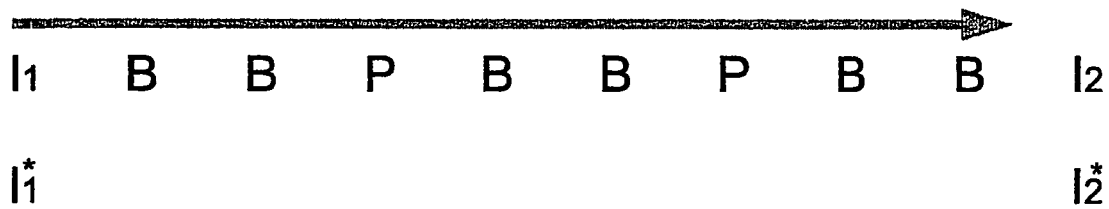
FIG. 2 shows frames of a video data stream.

In FIG. 1, four different types of imperfections, as often occur after relatively long use or on careless handling of optical recording media OD, are illustrated on two optical recording media OD. Examples of such imperfections are fingerprints E1, dust E2 or scratches which have a linear E3 or radial E4 profile. During the reproduction of information recorded on the optical recording medium OD, such imperfections lead to read errors or to interruptions in the scanned data stream. If the data stream is an MPEG data stream containing an MPEG video data stream, the sectors of the data stream typically form a group of pictures, as is illustrated in FIG. 2.

Figure 3:
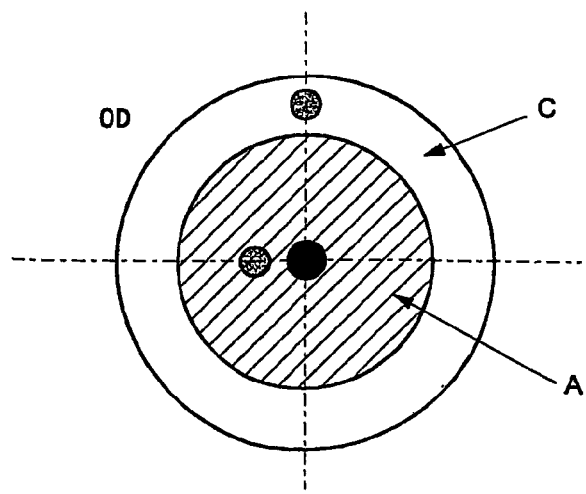
FIG. 3 shows an arrangement of replacement information items on an optical recording medium.

The individual picture of a video sequence is also designated as a frame and, as standard, the picture data rate of the digital video standard is 167 megabits per second. Without compression, video information could then be recorded only for approximately four minutes on a video-DVD having a storage capacity of 4.7 GB. However, video contains a multiplicity of redundant information since each individual pixel of a picture is assigned digital information items relating to the brightness and colour. Since unmoving picture components do not change over a relatively long period of time, it is entirely sufficient to code the changes in a picture or frame. Accordingly, an MPEG data stream contains so-called I frames I, which, independently of other frames, contain information about an entire individual picture, and also B frames B and P frames P. A B frame B utilizes preceding frames in order to calculate the compressed data content of the frames, and P frames P represent the difference in the I frames. A P frame analyses the preceding frames and thereby estimates where objects should be situated in the next frame. As illustrated in FIG. 2, an I frame I is followed by a respective number of difference pictures which necessarily require the start frame I1 in order to form the individual pictures. If an I frame I1 fails to appear, for example because it cannot be read from the recording medium OD and cannot be recovered by a conventional error correction, the subsequent pictures B, B, P, B, B, P, B, B of the group of pictures cannot be formed either. The reproduction of an entire data sequence would thereby be disturbed Therefore, an MPEG video recording medium is provided on which, for the reconstruction of a group of pictures, a replacement information item or a replacement I frame I1* for a disturbed I frame I1 is recorded in order to prevent or at least reduce interruptions in the picture progression. As illustrated in a schematic sketch in FIG. 3, this replacement information can be kept within the recording area A of the original data stream or else separately in a recording area B outside the recording area A of the original data stream on the optical recording medium OD. The replacement information items are provided on the recording medium OD in such a way that a reproduction by means of conventional reproduction apparatuses is not impeded or influenced. For this purpose, for the replacement information items, provision is made of a separate data stream with a dedicated data stream number which is formed for example with a StreamID, not part of the DVD standard, or the additional or replacement items are recorded in a so-called user data area which is situated before a group of individual pictures, also designated as GOP, and is not reproduced as video information. As a result, in conventional apparatuses, replacement information items are ignored, or skipped as errors, even when nested in the original data stream. Preferably, as illustrated in FIG. 6, additional or replacement information items are inserted in the original data stream at a distance of a plurality of groups of pictures GOP. It is appropriate to store a plurality of replacement I frames I* in groups GOP*, so that, by way of example, twenty replacement I frames I1* . . . I20* form a group of pictures GOP*a. For write-once and write-many recording media, the distance between these replacement I frames I* groups GOP* results from the minimum distance from the original picture information, which in turn results from the maximum error correction length of the error correction method chosen for the recording on the optical recording medium OD, and the size of the write memory which, during the recording operation, keeps the replacement I frames I* group GOP* until it can be stored on the optical recording medium OD.

FIG. 7 shows, by way of example, the content of tables TB1, TB2 which are used to produce a concordance with respect to the copies or similar I frames I* In this case, it is assumed that these tables TB1, TB2, as table TB, are recorded after the conclusion of a recording operation as a data stream which is provided with a private data stream identifier TableID. This private data stream identifier TableID, which is private_stream_id, for example, is likewise ignored and skipped by conventional reproduction apparatuses.

In this structure, the first table TB1, which contains the data stream identifier TableID and also the number of entries EntryTag[MAXENTRIES] and a pointer to a previous table PreviousTable, is provided in particular for the recording and the reproduction of a plurality of mutually independent video data streams.

However, the pointer to a previous table PreviousTable also makes it possible to find replacement I frames I* in other groups GOP* of replacement I frames I* within a video data stream without the need to keep a whole table at the end of the recording medium for this purpose or for a plurality of video data streams. The conclusion of a recording is formed by a second table TB2 of the table TB directly after the last group GOP* of replacement I frames In* that are kept.

As illustrated in FIG. 8, the pointer to the presence of a table TB can be kept in a file system FS provided for conventional reproduction apparatuses or in a separate directory.

The concordance table in accordance with the second table TB2 in FIG. 7 contains the positions for original I frames I as ReferenceFrameSectorID and for replacement I frames I* as RedundantFrameSectorID and also an identifier FrameInfoFlags which reveals how these replacement I frames I* are to be conditioned in order that they can be used for the reconstruction of the original data stream.

A video data stream with additional information items then has a structure illustrated in a schematic sketch in FIG. 8. The file system FS is followed by a video data stream sequence SMVS which contains, as video MV, the original data stream and replacement I frames I* and also a table TB. An area EONS following the video data stream sequence SMVS may then either be empty or a following video data stream sequence SMVS may be provided.

Figure 4:
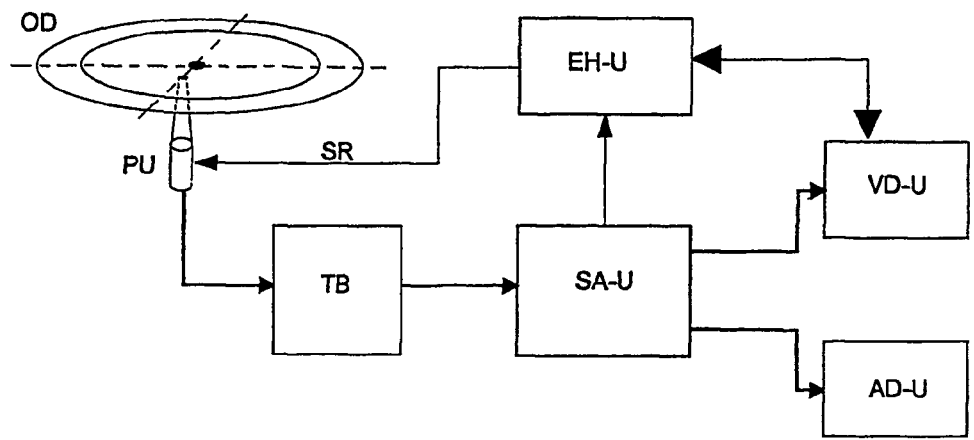
FIG. 4 shows a schematic sketch of a first reproduction apparatus for MPEG video recording media.

The construction of a reproduction apparatus for the reconstruction of missing data sequences of an original video data stream from an MPEG video recording medium with replacement information is illustrated as a schematic sketch in FIG. 4. The MPEG data stream scanned from an optical recording medium OD by an optical scanning device PU is firstly fed to a memory, a so-called track buffer TB, connected to the scanning device PU. Connected to the track buffer TB is a sector analysis device SA-U, which separates the data stream into individual streams for video and audio, which are then fed to the corresponding MPEG decoders for video VD-U and audio AD-U for reproduction.

If there are disturbances on the recording medium which cannot be eliminated by conventional error correction methods, gaps occur in the MPEG data stream and lead to disturbances in individual pictures or entire groups of pictures. These gaps are detected either by analysis of the sectors in the sector analysis device SA-U or during the decoding of the pictures in the video decoder VD-U and an item of information about the sector address of the missing or erroneous I frame I is communicated to an error processing unit EH-U. The error processing unit EH-U then initiates a check to determine whether additional or replacement information items which can eliminate or reduce the disturbance in the picture progression are available on the optical recording medium OD. The replacement information items are then requested from the scanning device PU by the error processing unit EH-U with a sector request SR and are inserted or entered into the picture progression in the video decoder VD-U.

Figure 5:
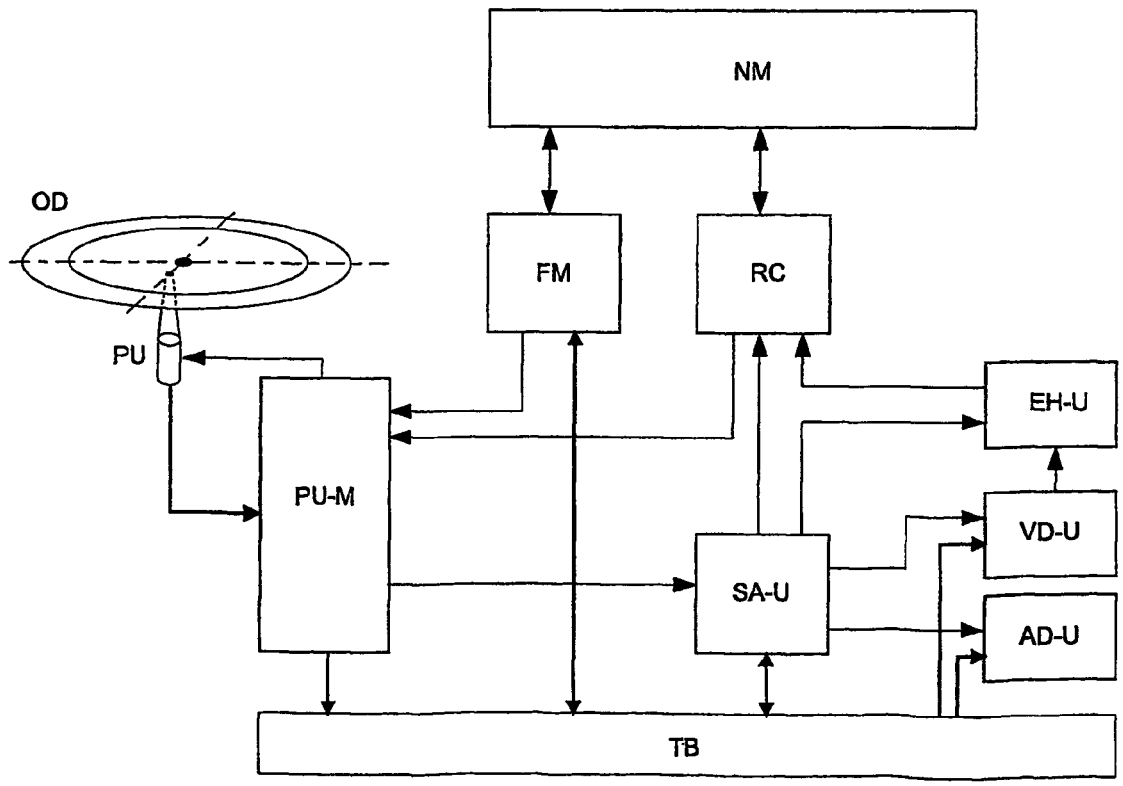
FIG. 5 shows a block diagram of a second reproduction apparatus for MPEG video recording media.

In accordance with a second embodiment illustrated as a block diagram in FIG. 5, a navigation manager NM is provided which comprises functions for the supervision of a user interface of the reproduction device. The navigation manager NM starts an access to the optical recording medium OD by the start positions of MPEG data streams on the optical recording medium OD being requested by means of a file system manager FM which communicates bidirectionally with the navigation manager NM. For this purpose, the file system manager FM transfers this request to a pick-up manager PU-M, which thereupon initiates a transmission of a data stream with the scanning device PU. The requested data are communicated to the pick-up manager PU-M by the scanning device PU and entered into a track buffer TB. The file system manager FM reads these sectors in the track buffer TB and from them determines the start positions of the MPEG data streams which it transfers to the navigation manager NM. The start positions of the MPEG data streams are also used to carry out a transmission of an MPEG data stream from the optical recording medium OD to the corresponding MPEG decoders for video VD-U and audio AD-U for the purpose of reproduction. In this case, the navigation manager NM transfers the start position of the MPEG data stream to a request control unit RC, which causes the pick-up manager PU-M to read a continuous MPEG data stream from the recording medium OD by means of the optical scanning device PU.

The MPEG data stream thus passes from the optical recording medium OD via the scanning device PU into the pick-up manager PU-M, which enters the data under supervision into the track buffer TB and already executes first measures for monitoring the continuity of the data stream. In this case, in a targeted manner, returns are executed for repeated read-in in order to close or reduce gaps in the data stream, and messages are communicated to the downstream sector analysis device SA-U in order to indicate a gap in the data stream. The sector analysis device SA-U additionally receives a list with start addresses in the track buffer TB which show the location at which the sectors of the MPEG data stream entered by the pick-up manager PU-M were stored. The sector analysis device SA-U distributes the individual partial data streams of the MPEG data stream with the aid of this list and the contents of the sectors. Partial lists are produced which are forwarded to the downstream MPEG decoders for video VD-U and audio AD-U.

In addition, the sector analysis device SA-U extends the data stream checking already performed by the pick-up manager PU-M by using existing information in the data stream, such as the sector number or the start identifiers of the MPEG data sections, to find out whether an MPEG video data stream has a gap in which there were I frames 1. If this is the case, an error notification is communicated to the error processing unit EH-U. Furthermore, instances where a range is exceeded, e.g. at the end of an MPEG data stream, can be captured and communicated to the navigation manager NM via the request control unit RC.

The video decoder VD-U receives the partial list of sector positions of the MPEG data stream in the track buffer TB which contain video sectors. If a missing or damaged I frame I is detected by this stage, for example by evaluation of the time stamps or comparisons of the number of macroblocks present with the picture size transferred in the video data stream, an error notification is likewise communicated to the error processing unit EH-U. The error processing unit EH-U initiates an access by the request control unit RC to the table with the additional information items, which is then communicated via the pick-up manager PU-M and the sector analysis device SA-U from the scanning device PU to the error processing unit EH-U. The error processing unit EH-U determines from the table a possible replacement representation of the missing or damaged I frame I and starts a renewed enquiry for a sector stream via the request control unit RC and the pick-up manager PU-M with the scanning device PU from the optical recording medium OD.

The data stream which then follows is communicated from the scanning device PU and the pick-up manager PU-M to the sector analysis device SA-U. If the error in the data stream has already been detected in this stage, the replacement I frame I1* can be entered into the original data stream. If a larger gap with a plurality of missing I frames I1, I2, . . . was involved, each replaced I frame I is signed off in the error processing unit EH-U, which thereupon checks whether further replacement I frames I2* must still be requested. If this is not the case, the error processing unit EH-U can request a new data stream which starts with the sector number at which the gap was detected. Normal processing of the original MPEG data stream is resumed at this point.

If the error in the data stream was detected in the video decoder VD-U, the error processing unit EB-U likewise requests a table. The start address for a replacement I frame I* which emerges from this table is subsequently determined and this replacement I frame I* is requested. The decoded replacement I frame I* can then replace a missing or damaged I frame I in the event of a renewed request of the data stream of the group of pictures. If a plurality of I frames I are affected in this case, too, it may be necessary for the error processing unit EH-U to request replacement I frames I*, which are decoded and reproduced, until a valid or original MPEG video data stream again passes into the video decoder VD-U.

As a result, a complete reproduction of recorded video information without interruption is made possible despite damaged recording media having imperfections which cannot be corrected by conventional error correction methods.

The embodiments described here are specified only as examples and a person skilled in the art can realize other embodiments of the invention which remain within the scope of the invention.

The invention claimed is:

1. A computer readable medium having computer-executable instructions stored thereon for performing the following steps:
   determining a missing or erroneous I frame in an original data stream read from a recording medium with error detection means;
   starting a search for a copy or a similar I frame provided in addition to an original I frame on said recording medium from said recording medium with a navigation manager to which a file system manager and a request control unit are connected bidirectionally and with a pick-up manager requesting said copy or the similar I frame from said recording medium; and
   performing a reconstruction of missing or erroneous data sequences by replacing said missing or erroneous I frames in said original data stream in a track buffer connected to said pick-up manager or in said video decoder by said copy or the similar I frame by means of said file system manager or by means of a sector analysis device for reconstruction of missing or erroneous data sequences of the video data stream to provide the decoded signal.

2. A computer readable medium according to claim 1, wherein said step of requesting said copy or the similar I frame is performed with a control means both at a logical and at a physical distance with respect to the original I frame on said recording medium.

3. A computer readable medium according to claim 1, wherein said step of requesting said copy or the similar I frame with respect to the I frame of the original data stream is performed with a control means in groups inserted into said original data stream, on said recording medium.

4. A computer readable medium according to claim 1, wherein said step of requesting said copy or the similar I frame with respect to the I frame of the original data stream is performed with a control means to a concordance information item stored on said recording medium which specifies the location on said recording medium at which a copy or a similar I frame with respect to said original I frame is arranged.

5. A computer readable medium according to claim 4, wherein said step of requesting said copy or the similar I frame with respect to the I frame of the original data stream is performed with the control means to the concordance information item arranged in a user data area or after a group of copies or similar I frames on said recording medium.

6. Reproduction apparatus for the reconstruction of missing or erroneous data sequences of a video data stream from computer readable medium,
   wherein an error detection means determines a missing or erroneous I frame in an original data stream read from said computer readable medium, said error detection means starts a search for a copy or a similar I frame provided in addition to said original I frame on said computer readable medium;
   a control means reads a missing or erroneous I frame in said original data stream from said computer readable medium and replaces said missing or erroneous I frame with said copy or similar I frame read from said computer readable medium for the reconstruction of missing or erroneous data sequences of the video data stream, wherein said control means is a navigation manager to which a file system manager and a request control unit are connected bidirectionally, said control means driven by said error detection means and, with a pick-up manager, request said copy or the similar I frame from said recording medium;
   missing or erroneous I frames in said original data stream are replaced in a track buffer connected to said pick-up manager or in said video decoder by said copy or the similar I frame by means of said file system manager or by means of a sector analysis device for reconstruction of missing or erroneous data sequences of the video data stream; and
   a reconstructed video data stream is reproduced by a video decoder.

7. Reproduction apparatus according to claim 6, wherein said error detection means is a sector analysis device connected to said track buffer or is said video decoder, which are connected to an error processing unit provided as a control means.

8. Reproduction apparatus according to claim 6, wherein said error detection means is said pick-up manager, which enters said data stream from said computer readable medium into said track buffer, a sector analysis device or said video decoder, in which time stamps or the number of macroblocks contained in said data stream are evaluated.

9. Reproduction apparatus according to claim 6, wherein said control means is an error processing unit which is connected to said error detection means and, with a sector request, requests said copy or the similar I frame from said computer readable medium and inserts it in said video decoder by replacement of said missing or erroneous I frame in said original data stream for reconstructing missing or erroneous data sequences of said video data stream.

* * * * *